United States Patent [19]

Houck

[11] Patent Number: 5,603,287
[45] Date of Patent: Feb. 18, 1997

[54] ANIMAL SENSING AND REPELLING SYSTEM

[76] Inventor: George B. Houck, 5821 Woodboro Dr., Huntington Beach, Calif. 92649

[21] Appl. No.: 44,743

[22] Filed: Apr. 12, 1993

[51] Int. Cl.⁶ ................................................ A01K 29/00
[52] U.S. Cl. ............................................................ 119/719
[58] Field of Search ................................... 119/719, 720, 119/721; 340/573

[56] References Cited

U.S. PATENT DOCUMENTS

| | | |
|---|---|---|
| 3,336,530 | 8/1967 | Sloan et al. . |
| 3,412,394 | 11/1968 | Lewis et al. . |
| 4,101,873 | 7/1978 | Anderson et al. . |
| 4,503,399 | 3/1985 | Carr . |
| 4,684,932 | 8/1987 | Dill . |
| 4,823,367 | 4/1989 | Kreutzfeld . |
| 4,951,045 | 8/1990 | Knapp et al. . |
| 5,099,226 | 3/1992 | Andrews . |

Primary Examiner—Gene Mancene
Assistant Examiner—Thomas Price
Attorney, Agent, or Firm—Howard A. Kenyon

[57] ABSTRACT

A system for sensing and repelling an animal is disclosed. The system contains an infrared motion detector which detects any warm moving object. Once detection has occurred, a Radio Frequency (R.F.) pulse signal is transmitted by a radio transmitter/receiver to the involved area. If an animal such as a family pet is wearing a collar which contains a radio receiver/transmitter, the R.F. pulse signal is received by the receiver/transmitter in the collar and an R.F. pulse response signal is transmitted which is received by the transmitter/receiver in the system. If a signal is received, the repelling subsystems which is a flood light and a water spray is deactivated. If a signal is not received, the repelling subsystems are activated to scare the unwanted animal away. The system can also be used for sensing the presence of an animal since the R.F. unit is detachable and can be used as a stand alone unit.

16 Claims, 2 Drawing Sheets

ANIMAL SENSING AND REPELLING SYSTEM

BACKGROUND OF THE INVENTION

1. Field of the Invention

The present invention relates in general to a system for sensing and repelling animals and more specifically to a system that uses a floodlight and water spray for repelling animals.

2. Description of the Prior Art

There are a number of detecting devices available to determine the presence of an animal or person in a specific area. The well known infrared detection device connected to a flood lamp is a deterrent for intrusion that is installed in many households today. This item is very conventional. All of the present infrared detection devices utilize a timing mechanism to turn the light off after the intruder has passed. Some of these timing mechanisms are adjustable. U.S. Pat. No. 4,658,386 to Morris uses an infrared sensing device in the lid of a garbage can that triggers a ultrasonic sound wave when a dog or cat tries to knock the lid off the garbage can. U.S. Pat. No. 4,996,521 to Hollow uses a sensor to trigger a spraying system on a wall to deter a person writing graffiti on the wall. The present utilizes an infrared motion detector which detects any warm-moving object. If the mission was to deter all animals, a simple connection to any one of several repelling devices would suffice. However, if one has an animal in the yard, a distinction must be made between an unwanted animal such as a cat and a pet cat that one does not want to frighten and scare away. None of the prior art addresses the problem of distinguishing between an unwanted animal and a pet animal. In addition, part of the unit is detachable and can be used as a pet sensing device.

What is needed is a system that is not activated when a pet animal is in a yard and activated when an unwanted animal is in the yard. Accordingly, a fuller understanding of the invention may be obtained by referring to the Summary of the Invention, and the Detailed Description of the Preferred Embodiment, in addition to the scope of the invention defined by the Claims taken in conjunction with the accompanying drawings.

SUMMARY OF THE INVENTION

It is the object of the present invention to provide a deterrent to an unwanted animal in an area.

It is another object of the present invention to distinguish between an unwanted animal and a pet animal in an area.

It is yet another object of the present invention to provide a flood light and a water spray as a deterrent to an unwanted animal in an area.

It is still another object of the present invention to provide pet sensing.

Briefly, in accordance with the present invention, there is provided an animal repelling system that can be used in an area such as a backyard of a house to deter animals from entering the backyard. The system has the capability of distinguishing between a pet animal and an unwanted animal. The pet animal is fined with a collar that can receive an interrogating R.F. pulse signal and responds with an R.F. response pulse signal back to the repelling device. If the response signal is received, the repelling means is deactivated and if the response signal is not received, the repelling means is activated.

The system can be used as pet sensing since part of the system is a stand alone detached unit.

The novel features which are believed to be characteristic of the invention as to the system together with further objects and advantages thereof, will be better understood from the following description in connection with the accompanying drawings in which the presently preferred embodiments of the invention is illustrated by way of example. It is to be expressly understood, however, that the drawings are for purpose of illustration and description only, and are not intended as a definition of the limits of the invention.

These and other objectives, features and advantages of the present invention will become more readily apparent upon detailed consideration of the following description of a preferred embodiment with reference to the accompanying drawing.

DETAILED DESCRIPTION OF THE PREFERRED EMBODIMENT

Figure 1:
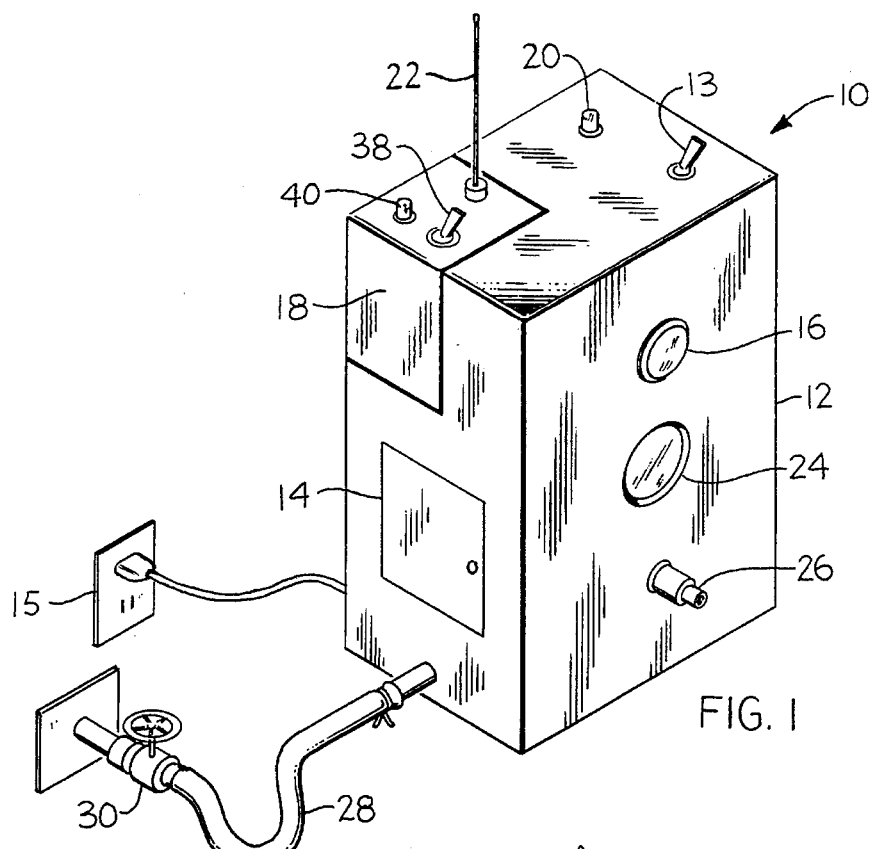
FIG. 1 is a perspective view of the animal sensing and repelling system.

Turning now to FIG. 1 there is seen a perspective view of the animal locating and repelling system generally shown as 10. The animal locating and repelling system 10 has a housing 12 that holds all of the electrical and plumbing components and controls (not shown) in the internal section of housing 12. A switch 13 is located on housing 12 that turns on the power from a 110 volt source 15 for the animal sensing and repelling system 10. An infrared motion sensor 16 is mounted on housing 12 that senses any warm bodied movement in a horizontal direction of ±45 degrees and a vertical direction of ±12 degrees. The infrared sensor is electronically connected to a radio frequency transmitter/receiver (not shown) in the sensing unit 18. The radio frequency transmitter/receiver in unit 18 sends out an R.F. pulse signal through the omni-directional antenna 22.

In FIG. 1 there is also seen a flood light 24 and a water nozzle 26 which will be activated by the animal sensing and repelling system 10 when required through the results of a logic circuit system. FIG. 1 also shows a water hose 28 connected to the animal sensing and repelling system 10 on one end and the other end being connected to a nozzle 30 which is further connected to a water supply that provides water pressure. A timing device (not shown) is adjustable to allow the repelling subsystems to cease after a given time of repelling action. This timing device is adjustable between 25 second and 2 minutes. In addition, the water nozzle is controlled by a 24 volt solenoid (not shown), activated by a 24 volt transformer (not shown) connected to a 110 volt power source, and further connected to a valve allowing water to flow when the solenoid is activated. The nozzle can be adjusted to give a jet, fan or spray stream.

Figure 2:
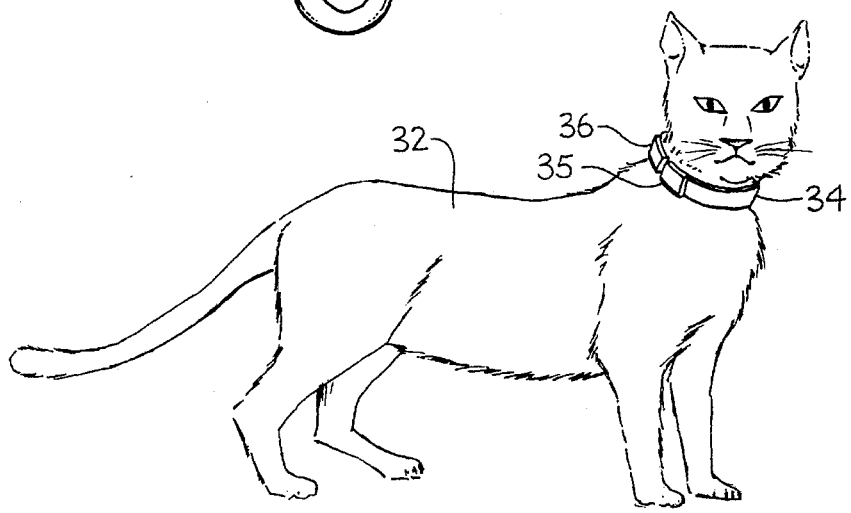
FIG. 2 is a view of an animal wearing a collar containing a receiver/transmitter.

FIG. 2 shows an animal 32, in the present case a cat, that has a collar 34 containing a radio frequency receiver/transmitter 35 which is in a section of the collar 34. This radio frequency receiver/transmitter 35 in collar 34 receives the R.F. pulse signal transmitted from the animal sensing and repelling system 10. A small omni-directional antenna 36 encased in the collar 34 is also seen in FIG. 2. The collar also contains a pulse demodulator circuit which is contained in the transmitter/receiver in said collar. The pulse demodulator circuit is an activator circuit which is tuned to the frequency of the radio frequency receiver/transmitter 35 in the animal sensing and repelling system 10. This radio frequency receiver/transmitter 35 in the pet collar 34 emits a response signal from an omni-directional antenna 36 encased in collar 34. The response signal is received by the radio frequency receiver/transmitter in unit 18 which produces a signal to deactivate the repelling means which is a flood light 24 and a water nozzle 26.

Figure 3:
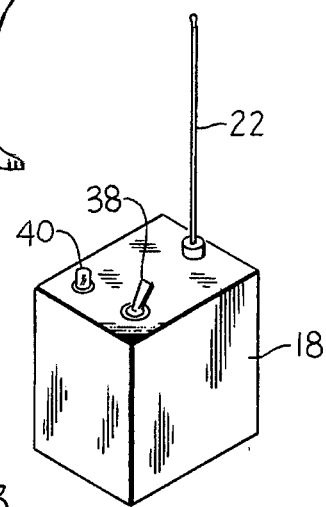
FIG. 3 is a perspective view of the sensing unit that has been removed from the system shown in FIG. 1.

FIG. 3 shows the sensing unit 18 that has been removed from the animal sensing and repelling system 10. The sensing unit 18, however, is self-contained having a battery pack (not shown) and having a switch 38 that has two positions, sensing only and sensing and repel. When the switch 38 is turned to sensing only, a battery pack will supply power to the sensing unit 18 so that it may operate independently of the sensing and repelling system 10. When switch 38 is turned to sensing only, the repelling subsystems are deactivated. The sensing unit 18 is designed to be separated from the repelling system in order to move to an area that may contain a lost pet. Once contact is made with the lost pet, the light 40 will turn on. This will show that the pet is in the vicinity of the sensing system's range.

Figure 4:
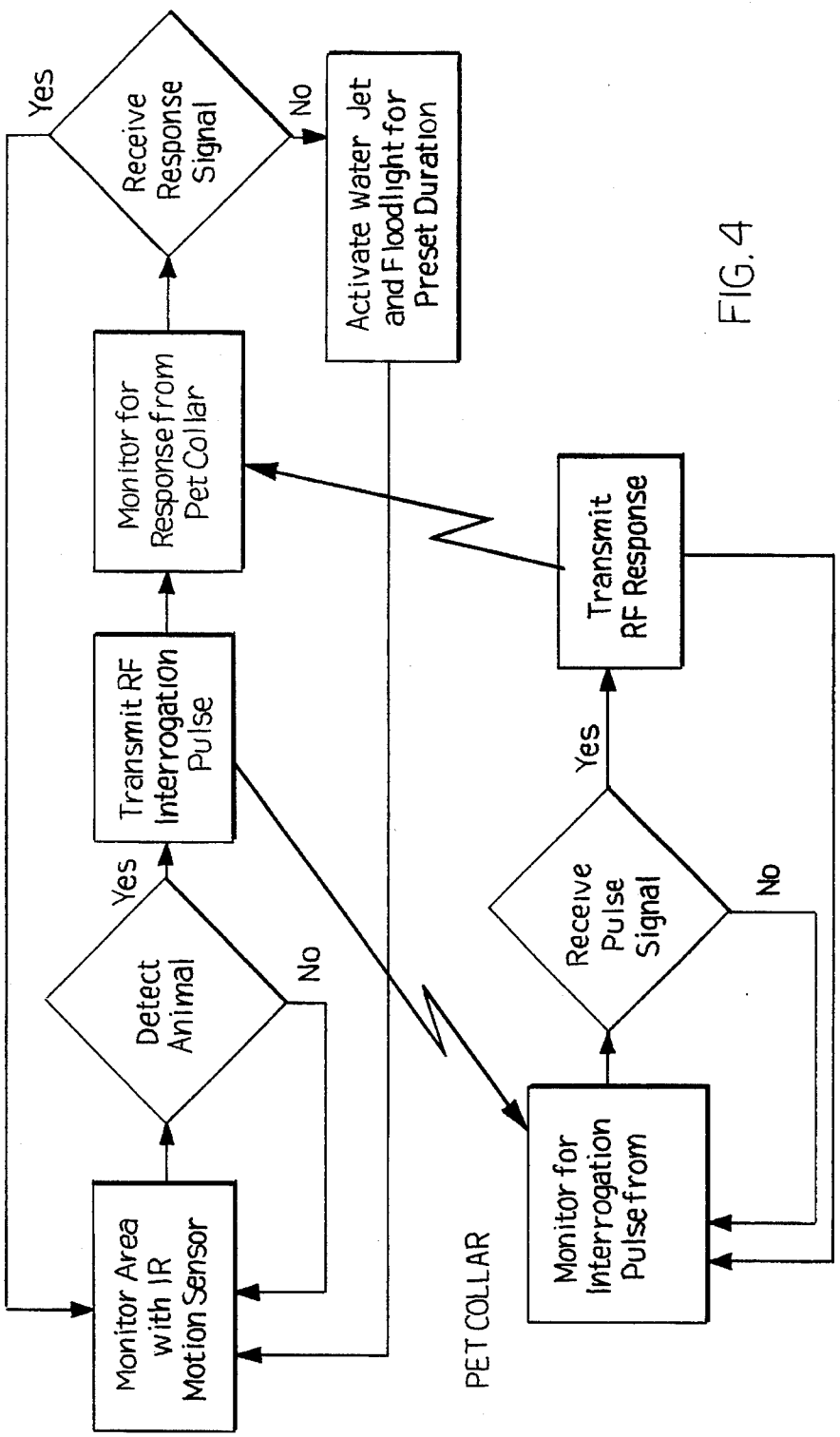
FIG. 4 is a functional diagram of the operation of the system shown in FIG. 1.

Turning now to FIG. 4, there is seen a functional diagram that portrays the sequence of operation. The diagram is divided into two main functions. One is for the sensing and repelling system 10 and the other is the pet collar 34. Basically the system sends out a pulse signal that is intercepted by an object in the path of the infrared motion sensor. If the pulse signal is received and a response signal is transmitted to the system, no repelling actions will take place. If no signal is received, the animal sensing and repelling system 10 will transmit a signal to activate the flood light 24 and water spray 26.

The subsystems are a floodlight 24 and a water spray emanating from nozzle 26. The water spray 26 is adjustable to direct a steady stream. This stream will be more effective if it is directed toward an object such as an empty metal garbage can (not shown) which will provide a loud noise.

Thus, it is apparent that there has been provided, in accordance with the invention, an animal locating and repelling system that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and scope of the appended claims.

What is claimed is:

1. A system for sensing and repelling animals comprising:
   means for sensing the presence of an animal in the vicinity of said system;
   a radio frequency transmitter having an omni directional antenna to transmit an R.F. pulse signal;
   means to be worn on said animal for receiving said R.F. pulse signal within said system;
   means for activating an R.F. pulse response signal triggered from said R.F. pulse signal,
   means for transmitting said R.F. pulse response signal to within said system;
   means in said system for receiving R.F. pulse response signal from said means for transmitting said R.F. pulse response signal.

2. A system for sensing and repelling animals as described in claim 1, wherein said means for sensing the presence of an animal in the vicinity of said system is an infrared motion detector which triggers a radio frequency transmitter receiver in said system which in turn produced an R.F. interrogating pulse signal.

3. A system for sensing and repelling animals as described in claim 2 wherein said infrared motion detector has a horizontal directional capability of plus or minus 45 degrees and a vertical directional capability of plus or minus 12 degrees.

4. A system for sensing and repelling animals as described in claim 2 wherein said infrared motion detector has a range of at least 50 yards.

5. A system for sensing and repelling animals as described in claim 1 wherein said means to be worn on said animal for receiving an R.F. pulse signal from said system is a radio frequency transmitter/receiver encased.

6. A system for sensing and repelling animals as described in claim 1 wherein said means to be worn for activating an R.F. response pulse signal triggered by said R.F. pulse signal is an activator circuit tuned to the frequency of a radio frequency transmitter/receiver in said system.

7. A system for sensing and repelling animals as described in claim 1 wherein said means for transmitting said R.F. pulse response signal to said system is a radio frequency transmitter/receiver having an omni-directional antenna encased in a collar worn on said animal.

8. A system for sensing and repelling animals as described in claim 7 wherein if said R.F. pulse response signal to said system is not received, repelling means will be activated whereby said repelling means is a flood light and water flow.

9. A system for sensing and repelling animals as described in claim 8 wherein said flood light and said water flow varies between 25 second and 2 minutes.

10. A system for sensing and repelling animals as described in claim 8 wherein said water flow is activated by a 24 volt solenoid on a sprinkler valve initiated by a signal from said radio frequency transmitter/receiver located in said system, said 24 volt solenoid being connected to a 24 volt transformer and said 24 volt transformer connected to a power source.

11. A system for sensing and repelling animals as described in claim 8 wherein said water flow may produce flow in a selectable form of a jet, fan or spray.

12. A system for sensing and repelling animals as described in claim 8 wherein said flood light is activated by a 110 volt switch connected to and triggered by said radio frequency transmitter receiver.

13. A system for sensing and repelling animals as described in claim 8 wherein said water flow to said system is by a hose connected to a domestic water supply.

14. A system for sensing and repelling animals as described in claim 7 wherein said means in said system for receiving an R.F. pulse response signal from said radio frequency transmitter/receiver on said animal is a radio frequency transmitter/receiver in said system that produces a signal to repelling means which will in turn deactivate said repelling means if an R.F. pulse response signal is received.

15. A system for sensing and repelling animals comprising:
   a housing;
   an infrared motion sensor in said system which produces an interrogating signal;

a radio frequency transmitter/receiver having an omnidirectional antenna for sending an R.F. pulse signal from said system;

a radio frequency transmitter/receiver in a collar to be worn worn on said animal for receiving said R.F. signal from said system;

a pulse demodulator circuit in said collar tuned to the frequency of said radio frequency transmitter/receiver in said system for activating a R.F. pulse response signal;

a radio frequency transmitter/receiver encased in a collar to be worn worn on said animal for transmitting said R.F. pulse response signal;

a radio frequency transmitter/receiver that produces a signal to said sensing and repelling system if an R.F. pulse response signal is received which will deactivate the repelling system and if an R.F. pulse response signal is not received will activate said repelling system.

16. A system for sensing and repelling an animal as described in claim 15 wherein said repelling system is a timed flood light and water flow, said water flow being adjustable to provide a jet, fan or spray.

* * * * *